US009172466B2

(12) United States Patent
Le Rouzic et al.

(10) Patent No.: US 9,172,466 B2
(45) Date of Patent: Oct. 27, 2015

(54) METHOD FOR SWITCHING AN OPTICAL DATA STREAM, COMPUTER PROGRAM PRODUCT AND CORRESPONDING STORAGE MEANS AND NODE

(75) Inventors: Esther Le Rouzic, Trebeurden (FR); Paulette Gavignet, Tregastel (FR)

(73) Assignee: FRANCE TELECOM, Paris (FR)

( * ) Notice: Subject to any disclaimer, the term of this patent is extended or adjusted under 35 U.S.C. 154(b) by 171 days.

(21) Appl. No.: 13/817,756

(22) PCT Filed: Jul. 25, 2011

(86) PCT No.: PCT/FR2011/051787
§ 371 (c)(1),
(2), (4) Date: Feb. 19, 2013

(87) PCT Pub. No.: WO2012/022884
PCT Pub. Date: Feb. 23, 2012

(65) Prior Publication Data
US 2013/0148964 A1    Jun. 13, 2013

(30) Foreign Application Priority Data

Aug. 19, 2010  (FR) ...................................... 10 56681

(51) Int. Cl.
*H04J 14/00* (2006.01)
*H04B 10/27* (2013.01)
(Continued)

(52) U.S. Cl.
CPC ............ *H04B 10/27* (2013.01); *H04J 14/0212* (2013.01); *H04J 14/0217* (2013.01); *H04J 14/0257* (2013.01); *H04J 14/0267* (2013.01); *H04J 14/0269* (2013.01);
(Continued)

(58) Field of Classification Search
None
See application file for complete search history.

(56) References Cited

U.S. PATENT DOCUMENTS 5,469,284 A * 11/1995 Haas ................................ 398/54
6,721,315 B1 * 4/2004 Xiong et al. ................... 370/389
(Continued)

FOREIGN PATENT DOCUMENTS

WO        2006121665 A1    11/2006

OTHER PUBLICATIONS

Vegesna, Vegesna, IP Quality of Service, 2001, Cisco Press, p. 217.*
(Continued)

*Primary Examiner* — Li Liu
*Assistant Examiner* — Jai Lee
(74) *Attorney, Agent, or Firm* — David D. Brush; Westman, Champlin & Koehler, P.A.

(57) ABSTRACT

A method and apparatus for switching an optical data stream via an optical network node, capable of switching optical data received at input ports to output ports. The method includes the following steps performed by a processing chain upon detection of a stream at a given wavelength by a given input port: determining a resource of the node based on a predetermined routing policy such that, for a given wavelength common to source and destination nodes of the stream, routing within the network is carried out according to a routing tree covering the network, a root of the tree being the destination node; consulting an occupancy table for the resource, indicating if at least one possible preceding stream is using the resource; determining a delay to be applied by the processing chain to prevent a collision between the stream and the possible preceding stream; and configuring the processing chain to apply the delay.

12 Claims, 10 Drawing Sheets

(51) Int. Cl.
    *H04J 14/02*    (2006.01)
    *H04Q 11/00*    (2006.01)

(52) U.S. Cl.
    CPC ...... *H04Q 11/0005* (2013.01); *H04Q 11/0066* (2013.01); *H04J14/0258* (2013.01); *H04J 14/0284* (2013.01); *H04Q 2011/002* (2013.01); *H04Q 2011/005* (2013.01); *H04Q 2011/0016* (2013.01); *H04Q 2011/0039* (2013.01); *H04Q 2011/0073* (2013.01)

(56) References Cited

U.S. PATENT DOCUMENTS

| | | | | |
|---|---|---|---|---|
| 6,804,255 | B1* | 10/2004 | Zheng et al. | 370/468 |
| 7,177,544 | B1* | 2/2007 | Wada et al. | 398/51 |
| 7,272,312 | B2* | 9/2007 | Sato | 398/49 |
| 7,809,265 | B2* | 10/2010 | Nuzman et al. | 398/47 |
| 7,835,649 | B2* | 11/2010 | Epps et al. | 398/155 |
| 7,945,165 | B2* | 5/2011 | Bernasconi et al. | 398/102 |
| 2006/0257145 | A1 | 11/2006 | Nuzman et al. | |

OTHER PUBLICATIONS

International Search Report and Written Opinion dated Sep. 23, 2011 for corresponding International Application No. PCT/FR2011/051787, filed Jul. 25, 2011.

Tancevski et al., "Optical Routing of Asynchronous, Variable Length Packets", IEEE Journal on Selected Areas in Communications, IEEE Service Center, Piscataway, US, vol. 18, No. 10, Oct. 1, 2000, pp. 2084-2093, XP000976897.

Yijun Xiong et al., "Control Architechure in Optical Burst-Switched WDM Networks", IEEE Journal on Selected Areas in Communications, IEEE Service Center, Piscataway, US, vol. 18, No. 10, Oct. 1, 2000, XP011055242.

French Search Report and Written Opinion dated Apr. 13, 2011 for corresponding French Application No. FR 1056681, filed Aug. 19, 2010.

International Preliminary Report on Patentability and English translation of Written Opinion dated Feb. 19, 2013 for corresponding International Application No. PCT/FR2011/051787, filed Jul. 25, 2011.

M.C.M. Qiao et al., "Optical Burst Switching (OBS): A New Paradigm for Optical Internet", Journal of High Speed Networks (JHSN), vol. 8.

* cited by examiner

METHOD FOR SWITCHING AN OPTICAL DATA STREAM, COMPUTER PROGRAM PRODUCT AND CORRESPONDING STORAGE MEANS AND NODE

CROSS-REFERENCE TO RELATED APPLICATIONS

This application is a Section 371 National Stage Application of International Application No. PCT/FR2011/051787, filed Jul. 25, 2011, which is incorporated by reference in its entirety and published as WO 2012/022884 on Feb. 23, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of optical communications networks.

More specifically, the disclosure pertains to a technique for switching optical data by a node included in an optical communications network.

The disclosure can be applied to numerous optical networks, such as for example ASON (Automatically Switched Optical Network), WSON (Wavelength-Switched Optical Network), OBS (Optical Burst Switching), OPS (Optical Packet Switching), as well as networks implementing the GMPLS (Generalized MultiProtocol Label Switching) protocol.

BACKGROUND OF THE DISCLOSURE

In recent years, increasing requests for bandwidth and quality of service on the part of users have prompted researchers to develop novel architectures and novel protocols for optical communications networks.

The WDM (wavelength division multiplexing) optical systems used in classic optical communications networks are not able to process current bandwidth requirements in an optimal manner, especially because of the great increase in the number of optical-electronic-optical conversions and multiplexing/demultiplexing operations and also because of the lack of flexibility in the occupancy of this bandwidth (high granularity, poor bandwidth occupancy).

In order to meet bandwidth needs, "all-optical" communications network architectures have been developed and appropriate optical switching techniques have been designed in order to make maximum use of the bandwidth offered by these architectures.

In the prior art, various classic techniques of optical switching are known: optical circuit switching circuits, optical packet switching and optical burst switching.

The architecture of optical networks implementing the technique of optical burst switching have been introduced by M. C. M. Qiao and M. J. S. Yoo, in: "*Optical Burst Switching (OBS)*: "*A new paradigm for Optical Internet*"—Journal of High Speed Networks (JHSN), Vol. 8, to compensate for the lack of reliability of optical circuit switching networks and the immaturity of optical packet switching techniques. Indeed, the technique of optical circuit switching is relatively simple to implement but suffers from a lack of flexibility in the face of fluctuating data traffic and the change in state of communications channels. The technique of optical packet switching is, for its part, conceptually ideal but highly complex to implement because it requires especially the presence of numerous delay lines and fast processing of the headers of the optical packets.

The OBS technique consists in assembling a plurality of optical data packets arriving at an input node (or peripheral node) of the network and intended for a same destination node of the network in a single group of data packets, called an optical data burst, and in routing this burst up to the destination node. Relay nodes (or intermediate nodes) enable the burst to be relayed from the input node to the destination node.

Unlike in the optical packet switching technique, the OBS technique enables the transmission of more data by means of bursts travelling through the optical network (a burst by itself comprising a plurality of optical data packets). Thus the technical constraints at each node of the network are reduced in view of the smaller number of headers to be processed. Furthermore, the OBS technique is able to make efficient use of the capacity (in terms of occupancy rates) of the communications channels.

Today, there are mainly two known embodiments of the OBS technique.

A first known embodiment, known as separate control channel OBS or BCP (burst control packet) OBS relies on the preliminary dispatch of a control packet on a dedicated transportation channel separate from the transportation channel of the optical data stream with which it is associated. The pieces of information contained in the control packet enable the node of an optical network to reserve the optical resources that are necessary for it to route the burst towards another node of the network.

In general, the term "collision" (or contention) of bursts is used when at least two optical data bursts take the same wavelength and seek to access the same output port at the same time.

A second known embodiment called "in-band" control channel OBS or label OBS consists of the transmission, on a same transportation channel, of a label situated at the head of the optical data stream, this label containing the control data.

The above-mentioned two known embodiments (separate control channel and in-band control channel) implement comparable mechanisms to resolve burst collision in the time, spectral and space domains.

The resolution of collisions in the spectral domain consists in modifying the wavelength of one or more bursts in collision so that all the bursts take the same output port simultaneously. This especially requires that each node of an optical network should be provided with wavelength converters.

Now, the use of such wavelength converters requires the mobilizing of considerable electrical resources. Besides, it limits the degree of transparency of the nodes that implement them, since the conversion mechanisms implemented are not transparent to the data modulation formats using especially phase modulation or polarization modulation. In other words, there is no conversion technique at present (apart from optical-electronic-optical conversion) that enables functioning with phase-modulated and polarization-modulated data. Consequently, the nodes comprising such wavelength converters are not totally transparent for the data.

Furthermore, although an optical data burst undergoes no electronic conversion (the burst is simply conveyed by nodes in the optical network), the control packet (or the label) associated with it nevertheless mobilizes energy resources because of the electronic processing applied to it (optical-electronic-optical conversion, extraction and analysis of control data, decision making, etc).

SUMMARY

In one particular embodiment of the invention, a method is proposed for switching an optical data stream by means of a node of an optical network capable of switching optical data received at input ports to output ports, the method comprising a step for managing collision comprising steps which, upon detection of a start of reception of a given stream of optical data on a given wavelength by a given input port, the given stream being intended for processing by a given processing line comprising a variable delay line, consist in:

determining a resource of the node as a function of a sensor having detected the given stream and as a function of a predetermined policy of transporting such that, for the given wavelength, which is common to the source and destination nodes of the given stream, the transporting in the optical network is done according to a routing tree that covers said optical network and of which one root is the destination node, said resource belonging to a group comprising an output port and a set of input ports;

consulting a table of occupancy of said resource, said table of occupancy indicating whether at least one preceding stream if any uses said resource;

determining a delay to be applied by the given processing line to prevent collision between the given stream and said at least one preceding stream if any;

configuring the variable delay line of the given processing line so that it applies the determined delay.

The general principle of this particular embodiment consists therefore in carrying out an analysis of the availability of a resource of a node of an optical network in the context of a switching of an optical data stream from an input port to one of the output ports, with a view to routing it to another node of the network. This analysis is based on a predetermined policy of transporting optical data streams in this network and makes it possible to determine the occupancy of the resource by at least one preceding stream if any. From this analysis, a delay to be applied to the optical data stream is determined so that it is transmitted in a time range for which the resource is not occupied, to prevent any collision between optical data streams.

The term "optical data stream" is understood to mean optical data received in the form of optical data packets as well as that of optical data bursts.

This particular embodiment of the invention therefore relies on a wholly novel and inventive approach which does not necessitate the presence of a control packet containing routing information as is the case in the prior art. Indeed, according to this particular embodiment, the routing (or transporting) of the given stream is done in a predetermined way upstream to the optical network so that, for a given wavelength common to the source and destination nodes of the given stream, the transporting in the network is done according to a routing tree that covers the optical network and one root of which is the destination node. Thus, owing to the absence of the control packet and therefore of the electronic processing associated with it, the use of energy resources is optimized.

Besides, the use of a local management mechanism for local management of temporal collisions prevents overall management of the collisions upstream by nodes of the network that would require complex cooperation between the source nodes of the same tree as well as a precise temporal synchronization between these nodes.

Furthermore, the use of a policy of transporting based on routing trees makes it possible to carry out management upstream to the collisions in wavelength, thus especially averting the use of wavelength converters within nodes of the optical stream. The absence of such converters therefore reduces the electrical consumption of the nodes.

According to a first particular embodiment, the resources being an output port, the step for determining the delay comprises steps for:

obtaining at least one piece of occupancy information from the table of occupancy indicating whether the determined output port is free or occupied by at least one preceding stream if any and, if it should be occupied, indicating a limit date of occupancy;

taking a zero duration for the delay if the determined output port is free;

determining a non-zero duration for the delay and is such that the given stream reaches the output port at a date subsequent to the limit occupancy date if the determined output port is occupied;

updating said at least one piece of occupancy information to indicate a new limit date of occupancy.

Thus, in this first embodiment, the determining of the duration of delay to be applied by the given processing line is done by means of information on occupancy of the output ports included in the table of occupancy.

According to a second particular embodiment, since the resource is a set of input ports, the step for determining the delay comprises steps for:

verifying that the variable delay line of the processing line associated with the sensor having detected the given stream is free and marking it as occupied;

obtaining at least one piece of occupancy information for each variable delay line of processing lines respectively associated with the input ports of the set, said piece of occupancy information indicating whether the variable delay line is free or occupied by at least one preceding stream;

configuring the variable delay line of each other free processing line with a new duration equal to the sum of a current duration plus a determined duration.

In this second embodiment, the determining of the duration of delay to be applied by the given processing line is done by means of information on occupancy of the input ports (or of the delay lines connected to these input ports) in the table of occupancy.

Advantageously, the method further comprises steps for:

updating a variable associated with the routing tree as a function of a date of arrival of the given stream;

modifying the table of occupancy of the variable delay line of the processing line associated with the sensor having detected the given stream, in order to indicate that the delay line is free, said modification being activated at the end of a duration, measured starting from the date of arrival of the given stream, and equal to the sum of the value of the variable and of a duration representing the duration of the given stream;

configuring the variable delay line of the processing line associated with the sensor having detected the given stream with the value of the variable.

The duration representing the duration of the stream can be a predetermined value or else a real value determined by detection of the instants of starting and ending of reception of the given stream.

Advantageously, the detection of a start of reception of a given optical data stream on a given wavelength by a given input port is obtained by a solution belonging to the group of solutions comprising the implementation of a detection of an envelope and the detection of a start demarcating field attached to the stream.

Preferably, the determining of a non-zero duration for the delay comprises a step for determining the duration of the given stream and the determining of the duration of the given stream is obtained by the detection of an end of reception of a given optical data stream on a given wavelength by a given input port, said detection being itself obtained by a solution belonging to a group of solutions comprising the implementation of a detection of an envelope and the detection of an end demarcating field attached to the stream.

Through knowledge of the date of reception of the given stream and through detection of the end of the stream, it is possible to determine the real duration of the stream and therefore determine more precisely the delay that must be applied by the given processing line so that there is no non-occupied time period between two successive streams. In other words, the estimation of the duration of occupancy of the resource by a given stream is optimized.

According to an advantageous characteristic, the method comprises a step for verifying that the variable delay line of the processing line associated with the sensor having detected the given stream is vacant. In the event of positive verification, the step for managing collision is carried out. If not, the given optical data stream is rejected.

This prevents a collision of two packets in the node, which would lead to the loss of both packets. One of the two packets is thus saved.

In another embodiment of the invention, there is proposed a computer program product comprising program code instructions for implementing the above-mentioned method (in any one of its different embodiments) when said program is executed on a computer.

In another embodiment of the invention, there is proposed a computer-readable storage medium storing a computer program comprising a set of computer-executable instructions to implement the above-mentioned method (in any one of its different embodiments).

In another embodiment of the invention, there is proposed a node of an optical network capable of switching optical data received at input ports to output ports and comprising means for managing collisions, themselves comprising the following means, activated upon detection of a start of reception of a given stream of optical data on a given wavelength by a given input port, the given stream being intended for processing by a given processing line comprising a variable delay line:

means for determining a resource of the node as a function of a sensor having detected the given stream and as a function of a predetermined policy of transporting such that, for the given wavelength, which is common to the source and destination nodes of the given stream, the transporting in the optical network is done according to a routing tree that covers said optical network and one root of which is the destination node, said resource belonging to a group comprising an output port and a set of input ports;

means for consulting a table of occupancy of said resource, said table of occupancy indicating whether at least one preceding stream if any uses said resource;

means for determining a delay to be applied by the given processing line to prevent collision between the given stream and said at least one preceding stream if any;

means for configuring the variable delay line of the given processing line so that it applies the determined delay.

According to an advantageous characteristic, the node comprises the following means, activated upon detection of a request for transmission to a destination node of a local data stream for which the local node is also a source node:

means for determining the output port to be used for the local burst, as a function of said predetermined policy of transporting;

means for obtaining at least one piece of information on occupancy, indicating whether the determined output port is free or occupied by at least one preceding burst, and should it be occupied, a limit date of occupancy;

means for determining a time range in which the determined output port is free to transmit the local burst as a function of said at least one piece of information on occupancy;

means for updating said at least one piece of information on occupancy, to indicate a new subsequent limit date of occupancy taking account of a reservation of the output port determined during said time range;

means for inserting the local stream in said determined output port, during said time range.

Advantageously, to detect the start of reception of a given optical data stream on a given wavelength by a given input port, the node comprises means for detecting an envelope and/or means for detecting a start demarcating field attached to the stream.

In another embodiment of the invention, there is proposed a system for switching optical data in an optical network comprising a plurality of nodes, each being capable of switching optical data received at the input ports to output ports, the system comprising, for each node of said plurality, means for managing collision comprising the following means, activated upon detection of a start of reception of a given stream of optical data on a given wavelength by a given input port, the given stream being intended for processing by a given processing line comprising a variable delay line:

means for determining a resource of said node as a function of a sensor having detected the given stream and as a function of a predetermined policy of transporting such that, for the given wavelength, which is common to source and destination nodes of the given stream belonging to said plurality of nodes, the transporting in the optical network is done according to a routing tree that covers said optical network and of which one root is the destination node, said resource belonging to a group comprising an output port and a set of input ports;

means for consulting a table of occupancy of said resource, said table of occupancy indicating whether at least one preceding stream if any uses said resource;

means for determining a delay to be applied by the given processing line to prevent a collision between the given stream and said at least one preceding stream if any;

means for configuring the variable delay line of the given processing line so that it applies the determined delay.

BRIEF DESCRIPTION OF THE DRAWINGS

Other characteristics and advantages shall appear from the following description given by way of an indicatory and non-exhaustive example and from the appended drawings, of which.

DETAILED DESCRIPTION OF ILLUSTRATIVE EMBODIMENTS

In all the figures of the present document, the identical elements and steps are designated by same numerical references.

Figure 1:
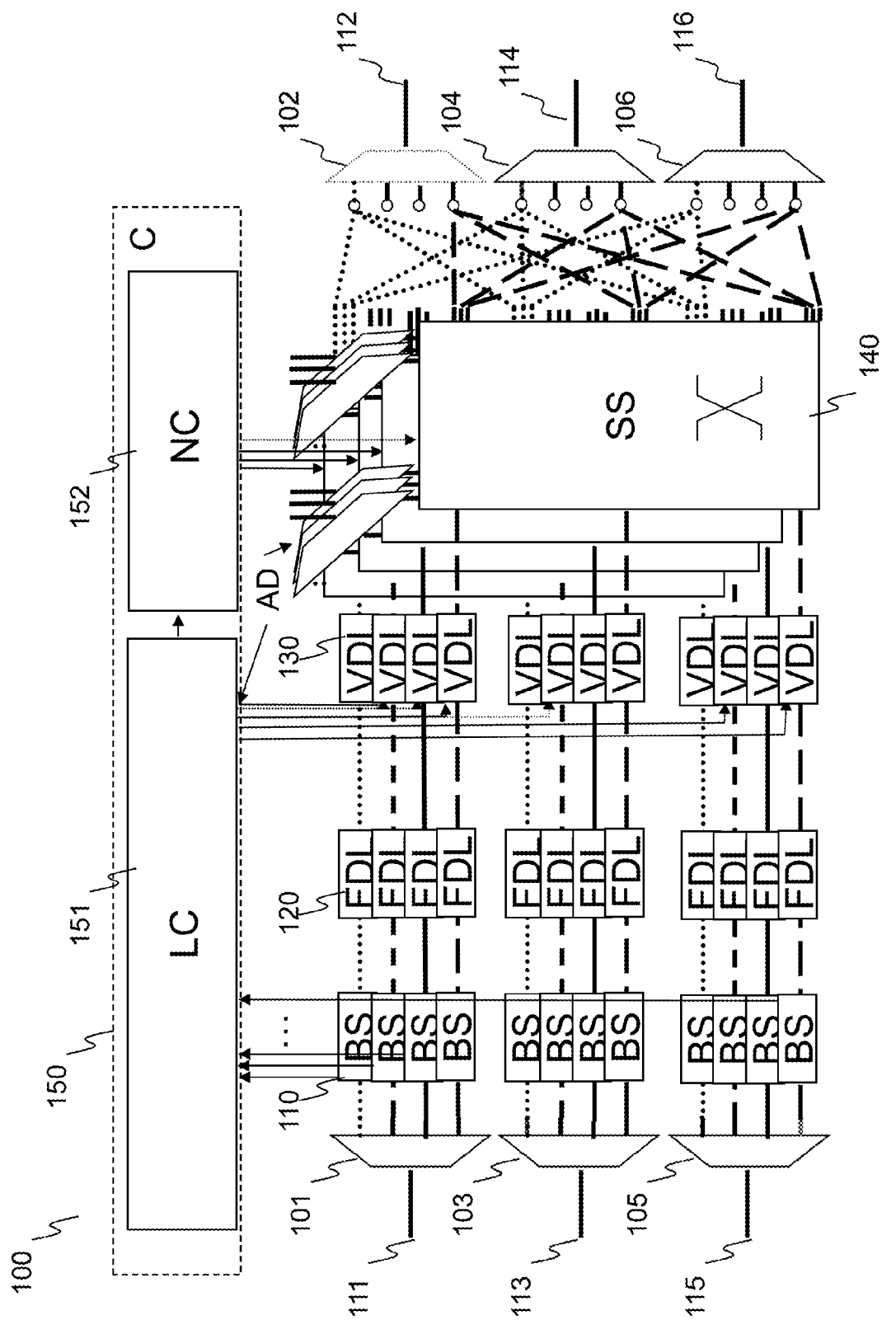
FIG. 1 presents the schematic structure of a relay node implementing the method for switching optical data streams according to one particular embodiment of the invention.

FIG. 1 presents the schematic structure of a relay node 100 implementing the method for switching optical data streams according to one particular embodiment of the invention.

The relay node 100 comprises more particularly:

three input ports 111, 113, 115 on each of which optical data streams are demultiplexed on four different wavelengths by means of demultiplexers 101, 103, 105;

three output ports 112, 114, 116 on each of which are multiplexed the optical data streams on four different wavelengths by means of the multiplexers 102, 140, 106;

an optical switch (denoted as SS or "Slow Switch") 140 interconnecting the input ports 111, 113, 115 and output ports 112, 114, 116 for each of the four wavelengths;

a controller 150 itself comprising a local control unit (denoted as LC or Local Controller) 151 responsible for configuring the processing lines, according to the principle described further below with reference to FIGS. 3 to 7 and a network control unit (denoted as NC for Network Controller) 152 responsible for configuring the optical switch 140 to transport the optical data stream on the determined output port according to the principle illustrated here below with reference to FIGS. 1 and 2.

The node 100 furthermore comprises, for each input port 111, 113, 115 and, for each wavelength, a processing line which itself comprises:

a sensor for detecting the optical data stream (denoted as BS or Burst Sensor) 110 responsible for detecting the arrival of a stream of optical data on a given wavelength;

a fixed delay line (FDL) 120 to apply a fixed delay of predetermined duration to the optical data stream being processed as a function of this processing time;

a variable delay line (VDL) 130 to apply a delay of variable duration to the optical data stream being processed to manage a contention, if any, that can occur between two or more data streams.

Upon detection of an optical data stream by one of the detection sensors 110 of the node 100, the controller 150 activates a counter in the local control unit 151 and an analysis of the availability of the resources of the node to transport the optical data stream. It must be noted that these resources can be one of the output ports according to an embodiment described further below or all the variable delay lines VDL of the processing lines which have, in common, a same output port because of the preliminary configuration of the switch 140 according to another embodiment. To this end, the controller 150 determines the resources to be used to delay (or eliminate) the optical data stream detected, it being known that the routing is already pre-configured towards another node of the optical network as a function of a preliminarily defined policy of transporting (or switching), (the principle of which is described in detail here below with reference to FIG. 2). This policy of transporting depends on the wavelength of the optical data stream detected which is known by the controller 150 in identifying the sensor 110 that has detected the optical data stream.

Once the resources for transporting the optical data stream have been determined, the local control unit 151 computes a duration of delay which can be included in a predetermined set of values or variables. This duration has to be applied by the variable delay line 130 of the processing line for the optical data stream to prevent a collision if any on the output port associated with the resources determined between the optical data stream under treatment and one or more preceding optical data streams already occupying the determined output port or already scheduled on the determined output port.

It must be noted that there are several ways according to one or more embodiments of the present invention to compute a duration of delay. Several examples of computation are illustrated further below with reference to FIGS. 3 to 6.

The determining of the resources as well as the computation of the delay to be applied by the processing line are operations that are performed while the optical data stream is delayed by the fixed delay line 120, for example for a duration of the order of one microsecond. The delay of this fixed delay line is predetermined especially as a function of the processing time.

After the duration of delay has been applied to the optical data stream, the optical data stream is conveyed to the output port of the optical switch 140 configured during a preliminary step by the network control unit 152. It is important to note here that this conveying (or switching) is not reconfigured for each optical data stream but that, on the contrary, all the optical data streams that reach an input port of the optical switch 140 will be oriented towards a same output port so long as the network control unit 152 does not reconfigure the existing configuration. The policy of configuration of the optical switch 140 is explained with reference to FIG. 2.

It must be noted that the controller 150 is not a simple juxtaposition of two control units 151 and 152 since the control unit 151 should be capable of consulting the configuration of the switch 140 done by the control unit 152 (according to the predetermined policy of transporting), in order to determine the resources whose availability must be analyzed to transport the optical data stream, for example the output port to which the optical data stream concerned will be routed or else all the variable delay lines VDL of the processing lines which have this same output port in common. The availability of these resources can for example be recorded in a table of occupancy of the control unit 151. Furthermore, the control unit 151 should be capable of consulting the table of occupancy to know if it can insert one (or more) local optical data streams and, if so, to know the point in time at which this can be done.

An embodiment of the present invention advantageously provides for the possibility of the relay node playing the role of a source node in order to transmit one (or more) local optical data streams. Upon detection of a request for transmission to a destination node of a local optical data stream at input of a local port (denoted as AD or add-drop in the figure), the control unit 151 determines the wavelength to be taken to reach the destination and then deduces the output port to be used for the local optical data stream, according to the predefined policy of transporting, and computes a time range in which the determined output port is free to insert the local optical data stream on the determined output port. In this case, the control unit 151 simply blocks any request for insertion that occurs outside the possible time ranges, and it is up to the client (who makes these requests) to make a new attempt later or to abandon transmission or else simply accept any request for insertion that takes place in these possible time ranges and reserve the targeted time range in the table of occupancy of the resources.

One variant consists in scheduling the insertion of the data as a function of the unoccupied time ranges (for example in placing the data in an electronic buffer before it is converted into the optical domain and reserving the targeted time range in the tables of occupancy the resources). It is also planned to schedule the insertion of data as a function of class of service (CoS) criteria. Thus, service data of non-priority class are inserted into the unoccupied time ranges.

The relay node 100 shown in FIG. 1 contains only three input ports and three output ports. The number of ports shown is deliberately limited, by way of purely pedagogical description, so as not to excessively burden the figure and the associated description but this number can be extended as also the number of wavelengths used (the size of the multiplexers-demultiplexers having to be adapted to the desired number of wavelengths).

Figure 2:
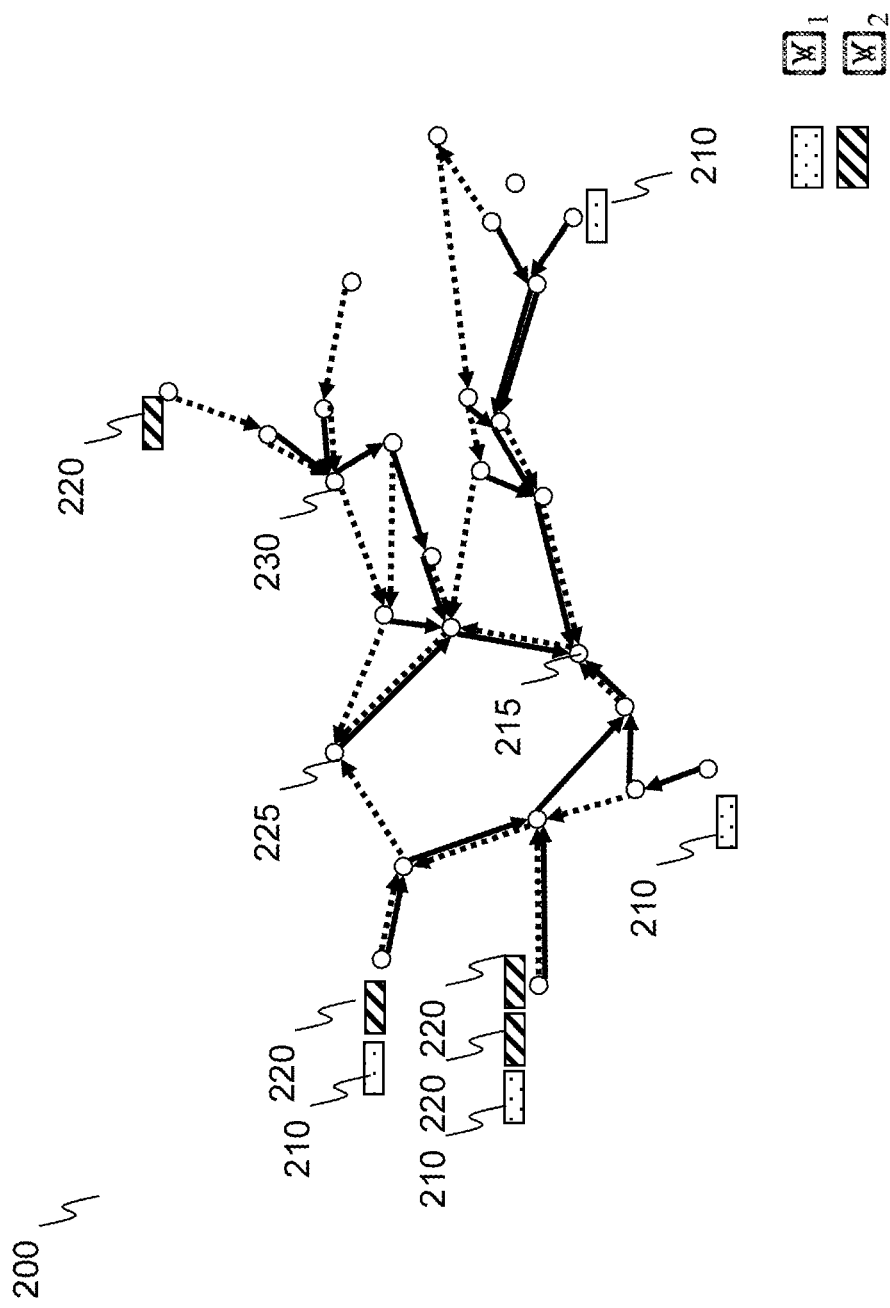
FIG. 2 illustrates an example of an optical network in which there is implemented the method for switching optical data streams according to one particular embodiment of the invention.

FIG. 2 illustrates an example of routing trees of optical data streams covering an optical range 200 according to the particular embodiment of the invention.

The optical network 200 has an architecture based on two routing trees, each routing tree being associated with a given wavelength ($\lambda_1$, $\lambda_2$). A source node chooses, for a given optical data stream 210, 220, the destination node 215 or 225 of this optical data stream in selecting the wavelength $\lambda_1$ or $\lambda_2$ which is associated with it. The routing of an optical data stream in the optical network 200 is therefore done by the choice of a wavelength ($\lambda_1$, $\lambda_2$) at the source node (upstream) and by means of a predefined routing tree.

Thus, for a given relay node, the output port to be used for a given optical data stream (switching policy) is determined as a function of the wavelength used by the source node to send the optical data stream. Thus, for each wavelength $\lambda_1$ or $\lambda_2$ common to source and destination nodes of the optical data stream, each relay node 230 carries out a predetermined routing of the optical data stream within a routing tree that covers the optical network 200 and has a root that is the destination node 215 or 225.

Contrary to the prior art, an embodiment of the present invention does not require the implementation of a control packet for each optical data stream in order to contain information on the routing of the optical data stream. Even less does it require the consultation of a routing table at each arrival of an optical data stream. Indeed, according to an embodiment of the present invention, the routing of each optical data stream is done in a predetermined way upstream to the optical network, by selection of the wavelength of the source node as a function of the wavelength of the destination node of the optical data stream. Owing to the absence of any control packets, an embodiment of the invention prevents the mobilizing of the energy resources normally needed to carry out the electronic processing of the control packets.

In one embodiment, only the demarcating field (or header) intended for detecting the arrival of an optical data stream by a detector sensor 110 must be present at the front of each optical data stream.

In another embodiment, the demarcating field is not necessary and the detection of the arrival of an optical data stream is done by detecting the envelope of the optical data stream. This other embodiment also makes it possible to detect the end of the optical data stream and, from this, to deduce the duration of the optical data stream. In a non-exhaustive example, the envelope detection is done by means of a semiconductor optical amplifier (SOA).

In addition, the use of a local management of the collisions in the time domain makes it possible to avoid overall management of the collisions by the source node. Such an overall management of the collisions requires cooperation between the source nodes, thus giving rise to constraints in terms of synchronization in time of the source nodes for example, or again in terms of complexity for the cooperation between the nodes of a same tree.

Furthermore, the use of wavelength converters in the prior art, within each network node (designed to carry out a local management of the collisions in wavelength) is not implemented, thus reducing the electrical consumption of the nodes of the network and overcoming all problems of transparency for bit rate and modulation format.

It must be noted that these routing trees can be reconfigured by means of a control plan capable of being implemented in the optical network 200 distributedly or a centralized way. Each routing tree is built as a function of the forecasts (such as annual forecasts for example) of growth in traffic volumes.

By way of an example, the building of the trees can advantageously be done in the case of a distributed control plan through an exchange of control messages, for example for synchronization of topology by a "GMPLS OSPF" type extension and signaling for example by a "GMPLS RSVP-TE" type extension. A request for connecting a node to an existing tree is processed upstream by the network control unit 152 in computing the route to the next connecting node on the basis of the topology obtained by the topology synchronization step and then by initializing messages for reserving resources in the nodes corresponding to this route. A request for creating a tree for the addition of a new node in the network 200 is processed upstream by the network control unit 152 in publishing the arrival of the node in question in the network 200 (topology synchronization step). The choice of the wavelength or wavelengths associated with this node is then done as a function of the other trees already in service.

It can advantageously be noted here that the number of nodes is not necessarily smaller than the number of wavelengths that can be used in an optical fiber. Indeed, two trees associated with the same wavelength can coexist if they have no link in common (i.e. if they have only nodes in common or else they have neither any node nor any link in common). This property can be obtained by the appropriate configuration of the switch 140, for example by configuring the input ports 111 and 115 towards the output port 114 and then the input port 115 towards the output port 112.

Figure 3:
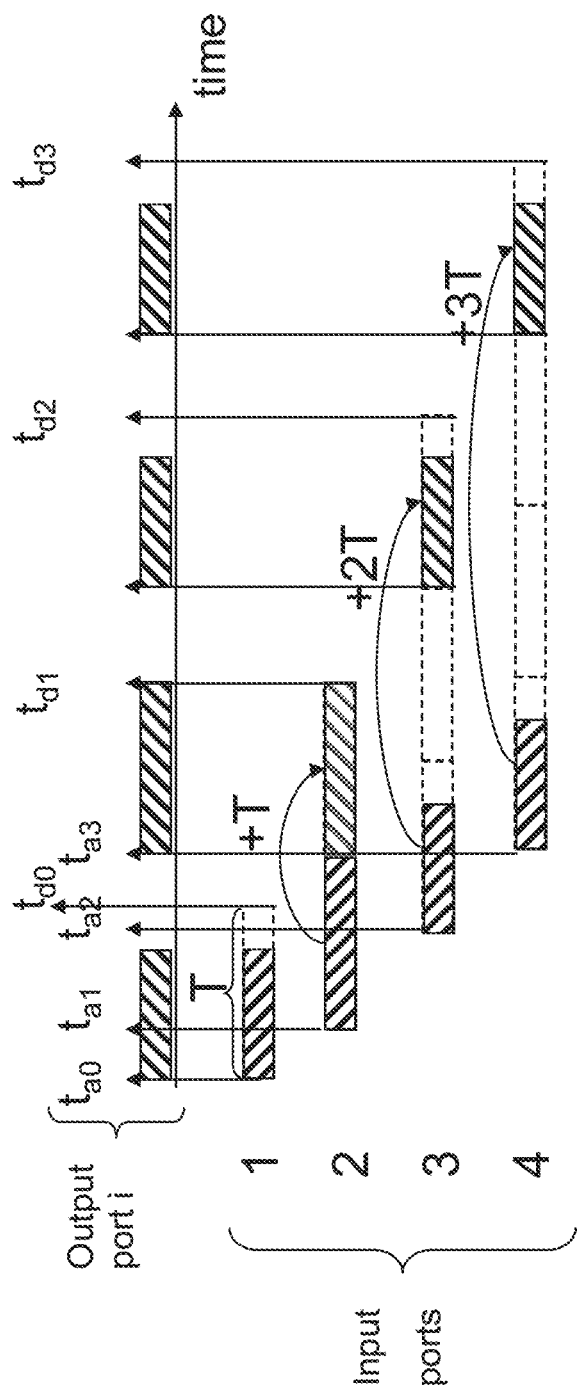
FIG. 3 represents an example of a graph illustrating a method for managing collisions in the time domain, by the use of a table of occupancy of the output ports, according to a first variant of a first embodiment of the invention.

FIG. 3 represents an example of a graph illustrating a method for managing collisions in the time domain by the use of a table of occupancy of the output ports according to a first variant of a first embodiment of the invention. In this first variant, the duration to be applied by the variable delay line can be chosen from a set of values which are multiples of a duration T representing the maximum duration of an optical data stream. By way of an illustration here below, the set of values corresponds to (0, T, 2T, 3T).

This table of occupancy of the output ports makes it possible to inform the node whether the output port determined for a given current optical data stream is free or occupied by one or more preceding optical data streams and, if it should be occupied, to indicate an end date (or limit date) of occupancy of this output port.

Here below, $T(i,j)$ denotes the table of occupancy of the output port i for the wavelength j. In this example, the table of occupancy $T(i,j)$ contains starting and ending dates of occupancy of the optical data streams.

During the initialization of the switching method, the table of occupancy $T(i,j)$ is vacant: $T(i,j)=\{\ \}$.

Through the building of the routing trees covering the optical network, the local controller knows that the output port corresponding to the input ports 1 to 4 for the wavelength j is the output port i. This knowledge is independent of the arrival of the optical data streams and is prior to any arrival of optical data streams.

At the date $t=t_{a0}$, the detection sensor detects the arrival of a first optical data stream on the wavelength j of the input port 1. This controller consults the table of occupancy $T(i,j)$ which is vacant and deduces from this that the output port i is free. The controller therefore decides to let the optical data stream pass through without applying any variable delay: the duration to be applied by the variable delay line is therefore zero ($VDL(1,j)=0$). It must be noted that the value of the delay $VDL(i,j)$ corresponds to the delay on the input i for the wavelength j. The controller then updates the table of occupancy in indicating that the output port i is now occupied for the period ranging from $t_{a0}$ to $t_{d0}$. The following table of occupancy is obtained:

$T(i,j)=\{(t_{a0},t_{d0})\}$, with $t_{d0}=t_{a0}+T$, with $t_{d0}$ being the date of end of occupancy of the first optical data stream, T the predetermined maximum duration of an optical data stream (known to all the nodes of the network) and $t_{a0}$ the date of start of reception of the first optical data stream.

At the date $t=t_{a1}$, the detection sensor 110 detects the arrival of a second optical data stream on the wavelength j of the input port 2. The controller consults the table of occupancy $T(i,j)$ and notes that the output port i is currently occupied but that it will be free at $t=t_{d0}$. The controller 150 notes that, by applying a delay equal to T, 2T or 3T (capable of being applied by the delay line VDL (2,j)), the output port i is free. Indeed, since the date $t_{a1}$ is greater than the date $t_{a0}$, the dates $t_{a1}+T$, $t_{a1}+2T$ and $t_{a1}+3T$ are therefore each greater than the date $t_{a0}+T$. The controller advantageously decides to use the smallest, among the delays T, 2T and 3T, of the available delays and configures the delay line $VDL(2,j)$ at T. The controller 150 then updates the table of occupancy $T(i,j)$ in indicating that the output port i is occupied for the period ranging from $t_{a1}+T$ to $t_{d1}+T$, with $t_{d1}+T=t_{a1}+T+T=t_{a1}+2T$ which corresponds to the date of end of occupancy of the second optical data stream. The following table of occupancy is then obtained:

$T(i,j)=\{(t_{a0},t_{a0}+T);(t_{a1}+T,t_{a1}+2T)\}$.

At the date $t=t_{a2}$, the detection sensor 110 detects the arrival of a third optical data stream on the wavelength j of the input port 3. The controller consults the table of occupancy $T(i,j)$ and notes that the corresponding output port i is currently occupied but that it will be free at $t=t_{a1}+2T$.

In this example, it must be noted that the date $t_{a1}$ occurs before the end of occupancy of the first optical data stream (i.e. at $t_{a0}+T$). Consequently, the time period $(t_{a1}+T)-(t_{a0}+T)$ is smaller than the maximum duration T of an optical data stream (since a reservation of the output port i is automatically done for a maximum duration T). It is therefore not possible, for a given optical data stream, to program a reservation of the output port i during the time period $(t_{a1}+T)-(t_{a0}+T)$, called a non-reservation time period.

The controller 150 notes that, by applying a delay equal to 2T or 3T (capable of being applied by the delay line $VDL(3,j)$), the output port i is free. Indeed, since the date $t_{a2}$ is greater than the date $t_{a1}$, but smaller than the date $t_{a1}+T$, the dates $t_{a2}+2T$ and $t_{a2}+3T$ are each greater than the duration $t_{a1}+2T$, but the date $t_{a2}+T$ is smaller than the date $t_{a1}+2T$. The controller 150 decides to use the smallest of the delays, among the available delays, i.e. the delay equal to 2T and configures $VDL(3,j)$ at 2T. The controller 150 then updates the table of occupancy $T(i,j)$ in indicating that the output port i is occupied for the period ranging from $t_{a2}+2T$ and $t_{d2}+T$, with $t_{d2}+T=t_{a2}+2T+T$ which corresponds to the date of end of occupancy of the third optical data stream. The following table of occupancy is then obtained:

$T(i,j)=\{(t_{a0},t_{a0}+T);(t_{a1}+T,t_{a1}+2T);(t_{a2}+2T,t_{a2}+3T)\}$.

At the date $t_{d0}$ (end of the first optical data stream), the controller 150 updates the table of occupancy $T(i,j)$ in erasing the reservation that had been made for the first optical data stream. The following table of occupancy is then obtained:

$T(i,j)=\{(t_{a1}+T,t_{a1}+2T);(t_{a2}+2T,t_{a2}+3T)\}$.

Such an updating enables an optical data stream received at the input port 1 to be capable of being transmitted on the output port i (according to the present method for managing collisions, in applying a delay by means of the delay line which is released). The corresponding processing line is then considered to be vacant.

At the date $t_{a3}$, the detection sensor 110 detects the arrival of a fourth optical data stream on the wavelength j of the input port 4.

It must be noted that, for the same reasons as above, no reservation of the output port i can be done in the period ranging from $t_{a1}+2T$ to $t_{a2}+2T$ (non-reservation time period). The controller 150 is constrained to delay the optical data stream being processed by a delay equal to 3T.

The controller configures the delay line $VDL(4,j)$ at 3T and updates the table of occupancy: $T(i,j)=\{(t_{a1}+T,t_{a1}+2T); (t_{a2}+2T,t_{a2}+3T); (t_{a3}+3T,t_{a3}+4T)\}$.

Figure 4:
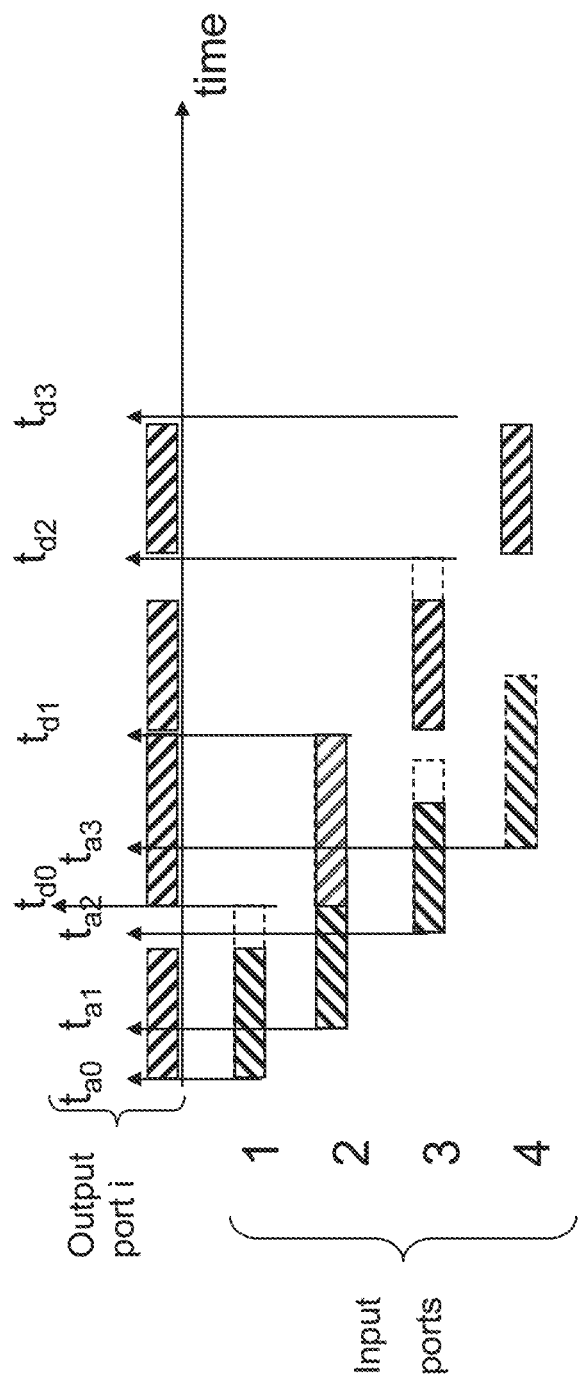
FIG. 4 represents an example of a graph illustrating a method for managing collisions in the time domain, by the use of a table of occupancy of the output ports, according to a second variant of the first embodiment of the invention.

FIG. 4 represents an example of a graph illustrating a method of management of collisions in the time domain through the use of table of occupancy of the output ports according to a second variant of the first embodiment of the invention. In this second variant, the duration to be applied by the variable delay line is adjustable.

At the date $t_{a0}$, the detection sensor 110 detects the arrival of a first optical data stream the input port 1 of the wavelength j. The controller 150 consults the table of occupancy T(i,j). By default, during the initialization of the switching method, the table of occupancy T(i,j) is vacant: T(i,j)={ }. The controller 150 then deduces from this that the output port i is free and therefore lets through the first optical data stream without applying any delay. To this end, it configures the delay line corresponding to the input 1 and to the wavelength j to 0 (VDL(1,j)=0). The controller 150 updates the table of occupancy T(i,j) in indicating that the output port i is occupied during the period ranging from $t_{a0}$ to $t_{d0}$, with $t_{d0}=t_{a0}+T$, $t_{d0}$ being the date of end of occupancy of the first optical data stream, t the maximum predetermined duration of an optical data stream and $t_{a0}$ the date of start of reception of the first optical data stream. The following table of occupancy is obtained: T(i,j)={$(t_{a0}, t_{d0})$}.

At the date $t=t_{a1}$, the detection sensor 110 detects the arrival of a second optical data stream on the wavelength j of the input port 2. The controller 150 consults the table of occupancy T(i,j) and notes that the output port i is currently occupied but that it will be free at the date $t_{d0}$. The controller 150 notes that, by applying a delay equal to $t_{d0}-t_{a1}$ (which can be applied by the delay line VDL(2,j)), the output port i is free. The controller 150 configures the delay line VDL(2,j) at $t_{a0}+T-t_{a1}$. The controller 150 then updates the table of occupancy T(i,j) in indicating that the output port i is occupied for the period ranging from $t_{a1}+(t_{a0}+T-t_{a1})$ to $t_{d1}$, with $t_{d1}=t_{a1}+(t_{a0}+T-t_{a1})+T$. The following table of occupancy is then obtained:

$$T(i,j)=\{(t_{a0},t_{a0}+T);(t_{a0}+T,t_{a0}+2T)\}$$

As in the case of FIG. 3, the graph of FIG. 4 shows that the time periods for which no reservation of the output port i can be programmed persists but that their duration is smaller. Indeed, since the limit date of occupancy assigned to an optical data stream depends, in this example, on the maximum duration T (which does not necessarily correspond to the real duration of an optical data stream), the controller 150 overestimates the duration needed for reserving the output port i for the given optical data stream.

At the date $t=t_{a2}$, the detection sensor 110 detects the arrival of a third optical data stream on the wavelength j of the input port 3. The controller consults the table of occupancy T(i,j) and notes that the output port i is currently occupied but that it will be free after the date $t_{a0}+2T$. The controller 150 therefore configures the delay line VDL(3,j) with a delay of a duration equal to $t_{d1}-t_{a2}$, that is $t_{a0}+2T-t_{a2}$. The controller 150 then updates the table of occupancy T(i,j) in indicating that the output port i is occupied for the period ranging from ta2+$(t_{a0}+2T-t_{a2})$ to $t_{d2}$, with $t_{d2}=t_{a0}+2T+T$. The following table of occupancy is then obtained:

$$T(i,j)=\{(t_{a0},t_{a0}+T);(t_{a0}+T,t_{a0}+2T);(t_{a0}+2T,t_{a0}+3T)\}.$$

At the date $t_{d0}=t_{a0}+T$ (end of the first optical data stream), the controller 150 updates the table of occupancy T(i,j) in erasing the reservation that had been made for the first optical data stream. The following table of occupancy is then obtained:

$$T(i,j)=\{(t_{a0}+T,t_{a0}+2T);(t_{a0}+2T,t_{a0}+3T)\}.$$

At the date $t=t_{a3}$ the detection sensor 110 detects the arrival of a fourth optical data stream on the wavelength j of the input port 4. The controller 150 consults the table of occupancy T(i,j) and notes that the output port i is currently occupied but that it will be free after the date $t_{a0}+3T$. The controller 150 then therefore configures the delay line VDL(4,j) with a delay of a duration equal to $t_{a0}+3T-t_{a3}$. The controller 150 then updates the table of occupancy T(i,j) in indicating that the output port i is also occupied for the period ranging from $t_{a3}+(t_{a0}+3T-t_{a3})$ to $t_{d3}$, with $t_{d3}=t_{a0}+3T+T$. The following table of occupancy is then obtained:

$$T(i,j)=\{(t_{a0}+T,t_{a0}+2T);(t_{a0}+2T,t_{a0}+3T);(t_{a0}+3T,t_{a0}+4T)\}.$$

Figure 5:
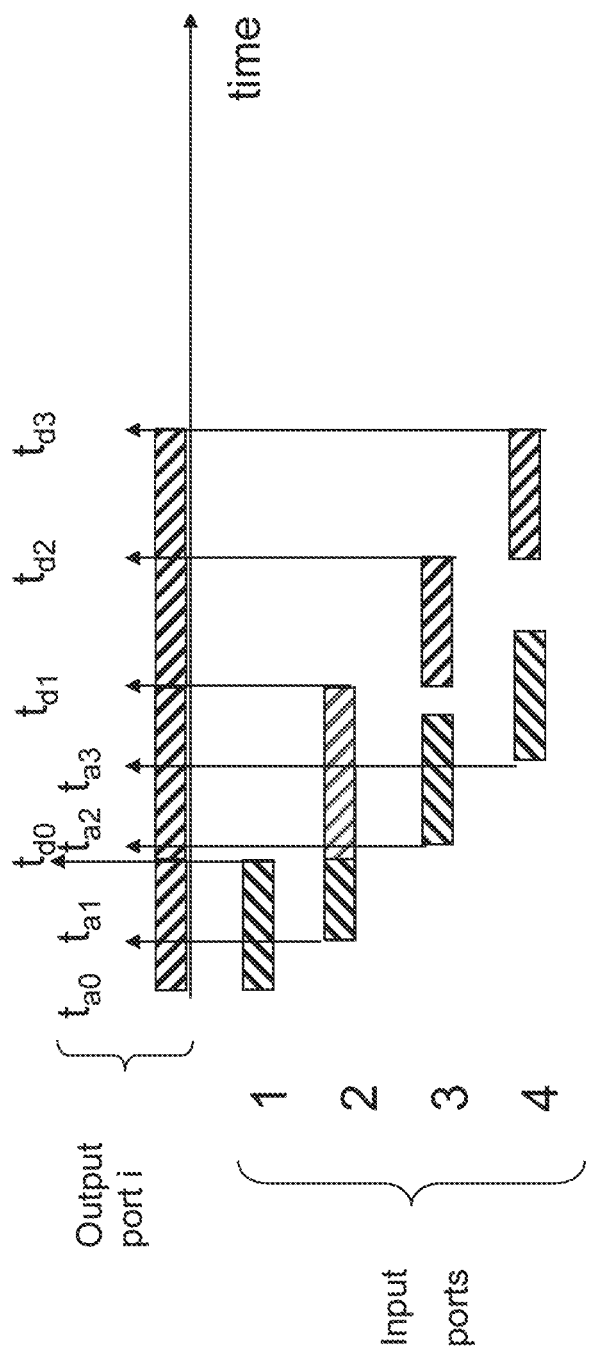
FIG. 5 represents an example of a graph illustrating a method for managing collisions in the time domain, by the use of a table of occupancy of the output ports, according to a third variant of the first embodiment of the invention.

FIG. 5 is an example of a chart illustrating a method of collision management in the time domain, by the use of a table of occupancy of the output ports according to a third variant of the first embodiment of the invention. In this third variant, the duration to be applied by the variable delay line is adjustable and the real duration of the optical data stream is taken into account. However, the durations of the optical data stream taken into account are part of a finite set of values.

At the date $t_{a0}$, the detection sensor 110 detects the arrival of a first optical data stream on the wavelength j of the input port 1. The controller consults the table of occupancy T(i,j). By default, during the initialization of the switching method, the table of occupancy T(i,j) is vacant: T(i,j)={ }. The controller 150 then deduces from this that the output port i is free and therefore lets the first optical data stream pass through without applying any delay. To this end, it configures the delay line corresponding to the input 1 and to the wavelength j to 0 (VDL(1,j)=0). The controller 150 then updates the table of occupancy T(i,j) in indicating that the output port i is occupied for the period ranging from $t_{a0}$ to $t_{d0}$, with $t_{d0}=t_{a0}+T1$, $t_{a0}$ being the date of start of reception of the premier optical data stream and T1 the real duration of the first optical data stream. The following table of occupancy is obtained:

$$T(i,j)=\{(t_{a0},t_{d0})\}.$$

At the date $t=t_{a1}$, the detection sensor 110 detects the arrival of a second optical data stream on the wavelength j of the input port 2, with a real duration T2. The controller 150 consults the table of occupancy T(i,j) and notes that the output port i is currently occupied but that it will be free at the date $t_{d0}$. The controller 150 notes that, by applying a delay equal to $t_{d0}-t_{a1}$, the output port i is free. The controller 150 configures the delay line VDL(2,j) at $t_{a0}+T1-t_{a1}$. The controller 150 then updates the table of occupancy T(i,j) in indicating that the output port i is occupied for the period ranging from $t_{a1}+(t_{a0}+T1-t_{a1})$ to $t_{d1}$, with $t_{a1}=t_{a1}+(t_{a0}+T1-t_{a1})+T2$. The following table of occupancy is obtained:

$$T(i,j)=\{(t_{a0},t_{a0}+T1);(t_{a0}+T1,t_{a0}+T1+T2)\}.$$

It must be noted that, unlike in the first and second examples illustrated here above, the optical data streams are programmed at the output port i one after the other without there being any unoccupied time period between two optical data streams.

At the date $t_{d0}=t_{a0}+T1$ (end of the first optical data stream), the controller 150 updates the table of occupancy T(i,j) in erasing the reservation that had been made for the first optical data stream. The following table of occupancy is then obtained:

$$T(i,j)=\{(t_{a0}+T1,t_{a0}+T1+T2)\}.$$

At the date $t=t_{a2}$, $t_{a3}$ the detection sensor 110 detects the arrival of a third optical data stream on the wavelength j of the input port 3, with a real duration T3. The controller 150 consults the table of occupancy T(i,j) and notes that the output port i is currently occupied but that it will be free after the date $t_{a0}+T1+T2$. The controller 150 therefore configures the delay line VDL(3,j) with a delay of a duration equal to $t_{d1}-t_{a2}$, that is, $t_{a0}+T1+T2-t_{a2}$. The controller 150 then updates the table of occupancy T(i,j) in indicating that the output port i is occupied for the period ranging from $t_{a2}+(t_{a0}+T1+T2-t_{a2})$ and $t_{d2}$, with $t_{d2}=t_{a0}+T1+T2+T3$. The following table of occupancy is obtained:

$$T(i,j)=\{(t_{a0}+T1, t_{a0}+T1+T2); (t_{a0}+T1+T2, t_{a0}+T1+T2+T3)\}.$$

At the date $t=t_{a3}$ the detection sensor 110 detects the arrival of a fourth optical data stream on the wavelength j of the input port 4, with a real duration T4. The controller 150 consults the table of occupancy $T(i,j)$ and notes that the output port i is currently occupied but that it will be free after the date $t_{a0}+T1+T2+T3$. The controller 150 therefore configures the delay line VDL(4,j) with a delay of a duration equal to $t_{a0}+T1+T2+T3-t_{a3}$. The controller 150 then updates the table of occupancy $T(i,j)$ in indicating that the output port i is also occupied for the period ranging from $t_{a3}+(t_{a0}+T1+T2+T3-t_{a3})$ to $t_{d3}$, with $t_{d3}=t_{a0}+T1+T2+T3+T4$. The following table of occupancy is obtained:

$$T(i,j)=\{(t_{a0}+T1, t_{a0}+T1+T2); (t_{a0}+T1+T2, t_{a0}+T1+T2+T3); (t_{a0}+T1+T2+T3, t_{a0}+T1+T2+T3+T4)\}.$$

It must be noted that, because of the absence of control packets, the node in principle does not know the duration of a given optical data stream. As in the example of FIGS. 3 and 4, it may be considered for example that an optical data stream received by a node has a predetermined maximum duration (T). In this case, what has to be done therefore is to apply a delay of a fixed duration T to each optical data stream received (in the event of a possible collision). It is also possible to know the real duration of an optical data stream received by a node. This duration can be determined:
- either by means of a piece of information on the duration of the optical data stream encoded in a header of the optical data stream;
- or by means of a field demarcating the end of an optical data stream;
- or by means of a detection of the envelope of the optical data stream;
- or by means of a detection of a prolonged absence of light by the detection sensor 110 of the optical data stream.

In another alternative embodiment, a table of occupancy is provided containing only the dates of end of occupancy of the output ports, thus avoiding the recording of a start of reception of an optical data stream. However, in order to refine the computation of duration to be applied by the variable delay lines and thus avoid the presence of a time period of non-occupancy between each reservation, it is preferable for the table of occupancy to include the dates of start of reception of optical data streams.

Figure 6:
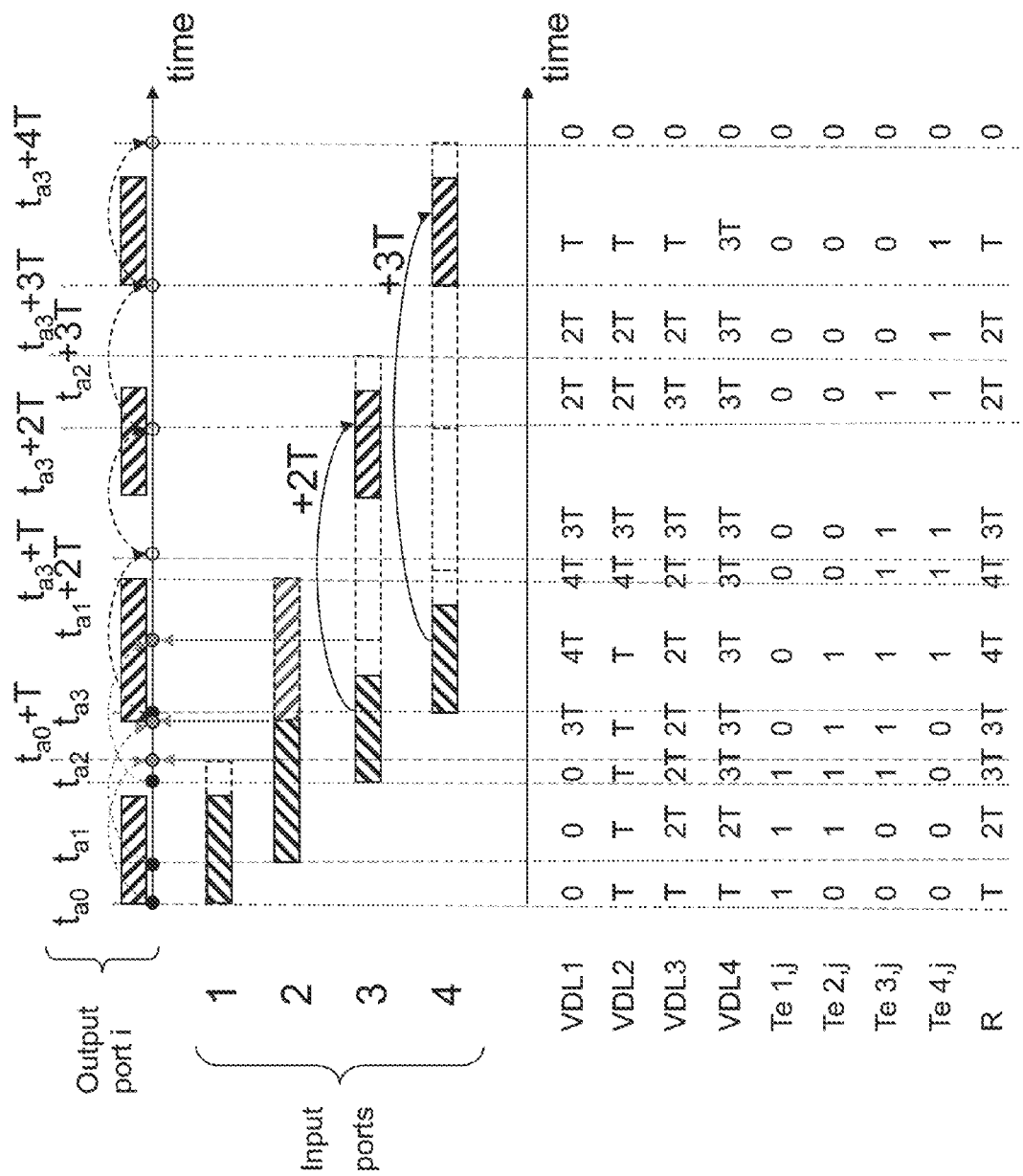
FIG. 6 represents an example of a graph illustrating a method for managing collisions in the time domain, by the use of a table of occupancy of delay lines, according to a second embodiment of the invention.

FIG. 6 represents an example of a graph illustrating a method of management of collisions in the time domain by the use of a table of occupancy of delay lines according to a second embodiment of the invention.

Unlike the particular embodiment described in FIGS. 3 to 5, which relies on a table of occupancy of the output ports of a node, the embodiment of FIG. 6 relies on a table of occupancy of delay lines corresponding to the input ports for each wavelength. The switching method then concerns the group of delay lines or input ports that belong to the same routing tree (in the example of the relay node 100, the occupancy of a delay line corresponds exactly to the occupancy of the input port for a given wavelength).

When the switching method is initialized, the table of occupancy is vacant by default $(Te(i,j)=\{\ \})$; the variable delay lines are configured with a zero duration $VDL(i,j)=0$; a delay variable R defined for the tree also contains a zero value $R=0$.

In this example, each optical data stream received by the relay node 100 is considered to have a predetermined maximum duration T.

At the date $t=t_{a0}$, the detection sensor 110 detects the arrival of a first optical data stream on the wavelength j of the input port 1. The controller 150 consults the table of occupancy of the delay lines and notes that it is vacant vide. It therefore lets the first optical data stream pass through without applying any delay since the variable delay line is configured with $VDL(1,j)=0$ and configures all the unoccupied variable delay lines with a delay of a duration equal to T, giving $VDL(2,j)=VDL(3,j)=VDL(4,j)=T$. The controller 150 updates the variable R in making it take the value T. The controller 150 furthermore programs a request for updating $VDL(1,j)$ and placing the variable R at the date $t_{a0}+T$. The controller 150 indicates that the input port 1 is occupied: $Te(1,j)=1$ (i.e. the corresponding delay line is occupied).

At the date $t=t_{a1}$, the detection sensor 110 detects the arrival of a second optical data stream on the wavelength j of the port 2. Since the variable delay line $VDL(2,j)$ is configured at T, the optical data stream is delayed by a duration equal to T before reaching the optical switch. At the date $t_{a1}$ the controller configures all the unoccupied variable delay lines with a delay of a duration incremented by T, giving $VDL(3,j)=VDL(4,j)=2T$, then updates the variable R in making it take the value 2T. The controller indicates in the table of occupancy that the input port 2 is occupied: $Te(2,j)=1$. It programs a request for updating $VDL(2,j)$ at the date $t_{a1}+2T$ and replaces the current date of updating of the variable R (formerly $t_{a0}+T$) with the date $t_{a1}+T$.

At the date $t=t_{a2}$, the detection sensor 110 detects the arrival of a third optical data stream on the wavelength j of the port 3. Since the variable delay line VDL(3,j) is configured at 2T in the table of occupancy, the optical data stream is delayed by a duration equal to 2T before it reaches the optical switch. At the date $t=t_{a2}$, the controller configures all the unoccupied variable delay lines with a delay of a duration incremented by T, $VDL(4,j)=3T$, then updates the variable R in making it take the value 3T.

The controller indicates in the table of occupancy that the input port 3 is occupied: $Te(3,j)=1$. It programs a request for updating $VDL(3,j)$ at the date $t_{a2}+3T$ and replaces the current date of updating of the variable R (formerly $t_{a1}+T$) with the date $t_{a2}+T$.

At the date $t_{a0}+T$ (end of the first optical data stream), the controller 150 updates the table of occupancy in placing the input port $Te(1,j)$ at 0 and the variable delay line $VDL(1,j)$ at the current value of the variable R (R=3T). Thus, if another optical data stream were to arrive at this instant at the input port 1, it could be programmed to undergo a delay such that it could be transmitted after the other optical data streams to the output port of the relay node 100.

At the date $t=t_{a3}$, the detection sensor 110 detects the arrival of a fourth optical data stream on the wavelength j of the input port 4.

Since the variable delay line VDL(4,j) is configured at 3T, the optical data stream is delayed by a duration equal to 3T before reaching the optical switch. Then the controller 150 configures all the unoccupied variable delay lines with a delay of a duration incremented by T, and then updates the variable R in making it take the value 4T.

The controller 150 indicates in the table of occupancy that the input port 4 is occupied: $Te(4,j)=1$. It programs a request for updating VDL4 at the date $t_{a3}+4T$ and replaces the current date of updating the variable R with the date $t_{a3}+T$.

At the date $t=t_{a1}+2T$, the controller 150 updates the duration of the delay of the variable delay line VDL(2,j) at the current value of the variable R (R=4T).

At the date $t=t_{a3}+T$, the values of the free variable delay lines are decremented by the value T, as also the variable R (R=3T). The next updating of R is programmed at the date $t_{a3}+2T$.

At the date $t=t_{a3}+T$, the values of the free variable delay lines are decremented by the value T, as also the variable R (R=2T). The next updating of the variable R is programmed at the date $t_{a3}+3T$.

At the date $t=t_{a2}+3T$, the controller 150 updates the duration of the delay of the variable delay line VDL(3,j) at the current value of the variable R (R=2T).

At the date $t=t_{a3}+3T$, the values of the free variable delay lines are decremented by the value T, as also the variable R (R=T). The next updating of the variable R is programmed at the date $t=t_{a3}+4T$.

At the date $t_{a3}+4T$, the values of the free variable delay lines are decremented by the value T, as also the variable R (R=0). The table of occupancy has returned to the initial state, and no updating is to be programmed.

Figure 7:
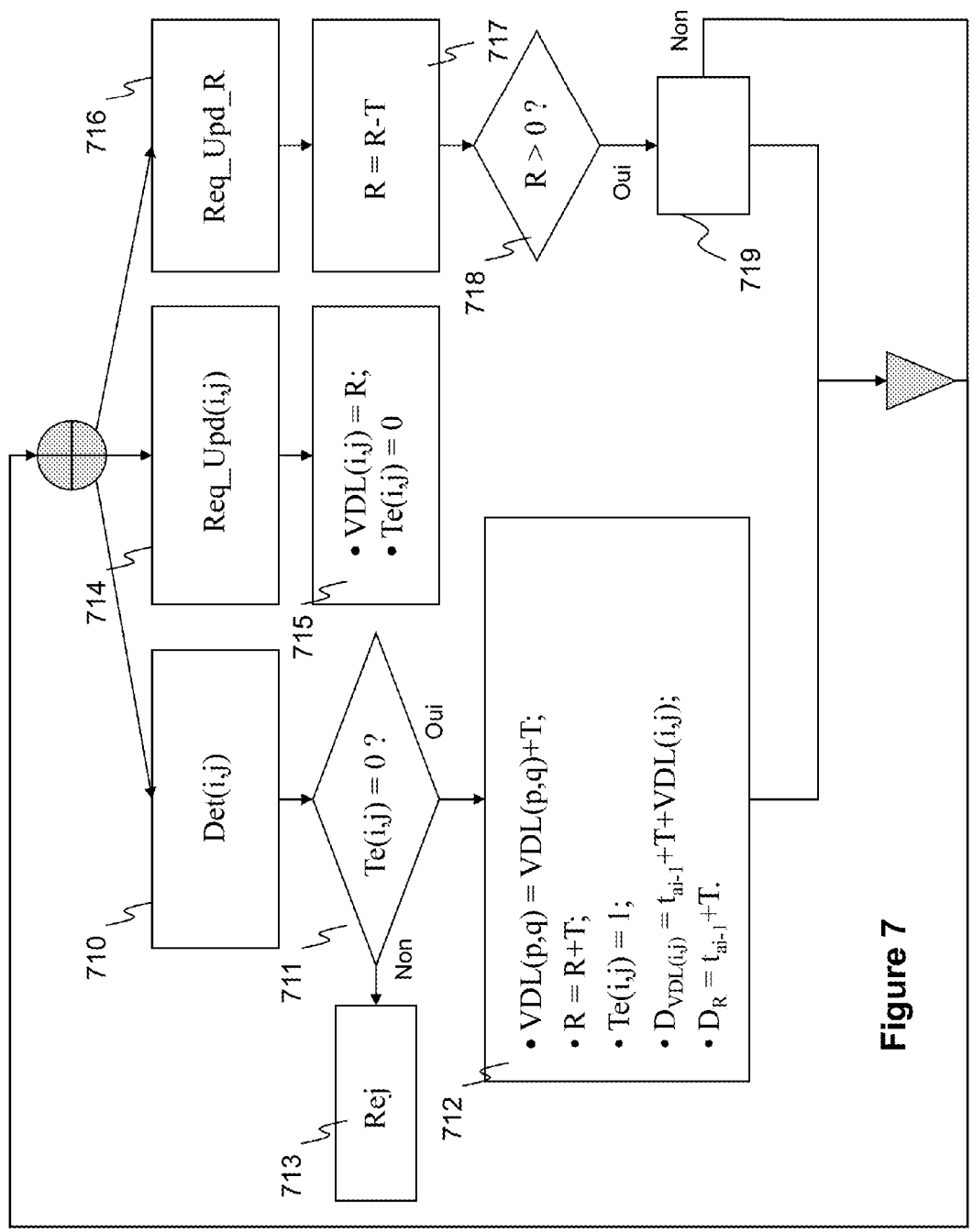
FIG. 7 is a flowchart of an algorithm for implementing a method for determining variable delays in the context of the second embodiment of FIG. 6.

FIG. 7 represents a flowchart of an algorithm for implementing a method for determining variable delays in the context of the second embodiment described with reference to FIG. 6.

At the step 710, the controller 150 detects the arrival of an optical data stream with a wavelength j on the input port i at a date $t_{ai-1}$.

The controller 150 then carries out a test at the step 711 to find out if the variable delay line VDL(i,j) considered is free or occupied by one or more preceding optical data streams by consulting the table Te(i,j).

If the variable delay line is occupied (Te(i,j)=1), the controller 150 passes to the step 713 in which it decides to reject the optical data stream detected on the input port i.

If the variable delay line is free (Te(i,j)=0), the controller 150 passes to the step 712. In this step, the controller 150 first of all configures each free delay line VDL(p,q) such that:

$$VDL(p,q)=VDL(p,q)+T$$

Then, it configures the delay variable R such that:

$$R=R+T$$

And it configures the table of occupancy for the delay line corresponding to the stream in progress such that:

$$Te(i,j)=1$$

The controller 150 then programs the date for updating the delay line VDL(i,j) at:

$$D_{VDL(i,j)}=t_{ai-1}+T+VDL(i,j)$$

The controller 150 also programs the date for updating the variable R at $D_R=t_{ai-1}+T$.

Upon a request for updating the delay line VDL(i,j) at the step 714, the controller 150 carries out the updating, at the step 715, of VDL(i,j) with the current value of the variable R and the updating of the table of occupancy Te(i,j) with the value 0.

Upon a request for updating the delay variable R at a date t at the step 716, the controller 150 decrements the delay of the free variable delay lines by a value T (unless this delay is already 0) as well as the variable R (R=R−T) (unless the variable R is already 0) at the step 717.

The controller 150 then carries out a test at the step 718 to find out if the delay variable R is strictly greater than 0.

If this is not the case (R=0), then it means that the table of occupancy has returned to the initial state and no updating has to be programmed.

If this is the case (R>0), then the date for updating the variable R is programmed at a date t+T during a step 719.

Figure 8:
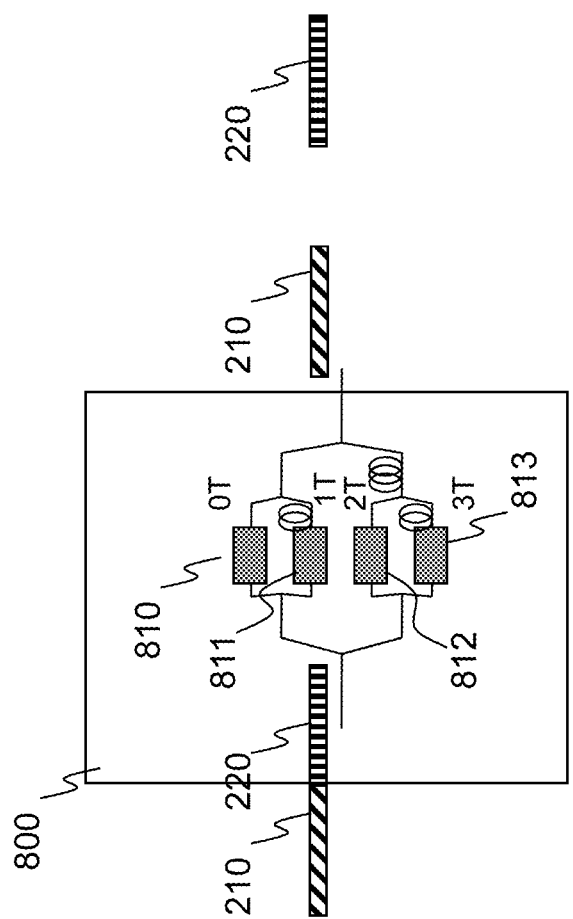
FIG. 8 illustrates an example of a variable delay line that can be implemented in a node according to one particular embodiment of the invention.

FIG. 8 illustrates an example of a variable delay line 800 that can be implemented in a relay node 100 according to one particular embodiment of the invention.

The variable delay line 800 more particularly has the plurality of arms 810, 811, 812, 813 in parallel, each arm 810, 811, 812, 813 enabling the application of a distinct delay with a duration respectively of 0, T, 2T, 3T. When the variable delay line 800 is configured for a given optical data stream 220, the controller checks that at least one of the arms 810, 811, 812, 813 makes it possible to apply the delay which has been determined to delay this given optical data stream 220.

If this is the case, the controller selects the arm enabling the application of the determined delay for the given optical data stream and then blocks the selected arm as soon as the end of the given optical data stream has passed the input of the arms so as to block the delay line for any other stream (for example the stream 210).

If this is not the case, the controller rejects the given optical data stream (for example by blocking all the arms).

For example, if a delay of a duration T is applied to a first optical data stream 220, a delay of a duration 2T can be programmed for a second optical data stream 210 provided that the duration of the second optical data stream is strictly smaller than the duration T to prevent a collision at output of the delay line 800. This is why the controller carries out a locking of the selected arm 811 as soon as the first optical data stream 220 has been outputted from it.

It must be noted that this example of a variable delay line is compatible with each of the first and second embodiments described further above with reference to FIGS. 3, 4, 5 and 6.

It can be considered for example that, beyond a duration equal to 3T, it is no longer possible to apply any delay by means of the delay line. Since a delay of a duration equal to 4T is thus not achievable, the controller 150 decides to erase the corresponding optical data stream.

In one particular embodiment, it is also possible to plan for several input ports (for example the two input ports 111 and 113) to be connected to the optical switch 140 for one or more wavelengths through a single common processing line, this common processing line comprising a variable delay line VDL shared by the different input ports.

Figure 9:
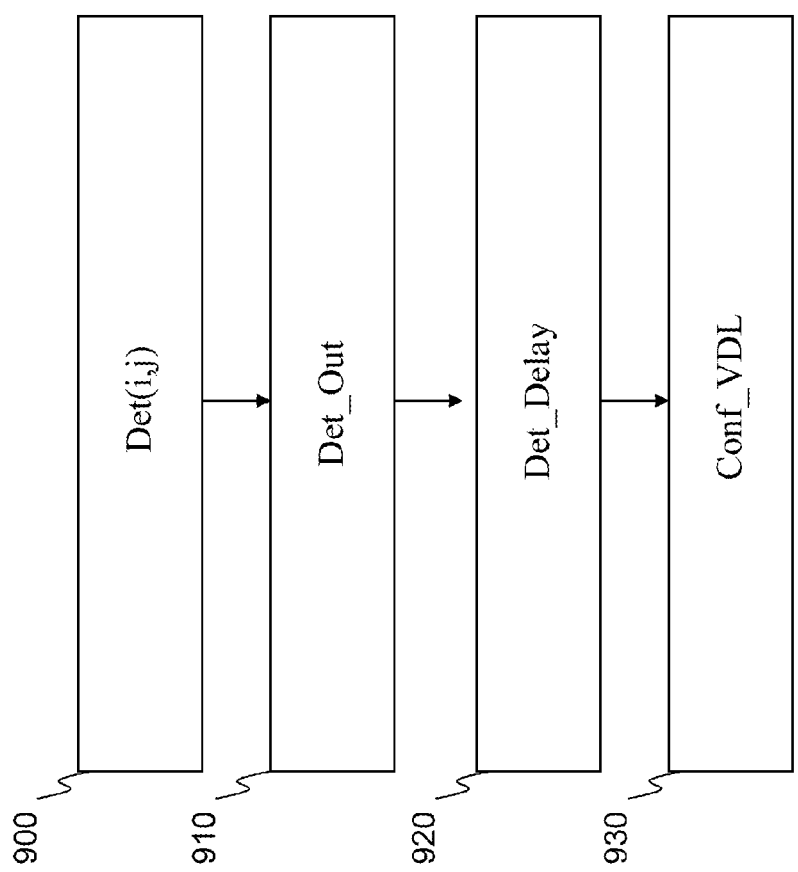
FIG. 9 is a flowchart of an algorithm for implementing the switching method according to one particular embodiment of the invention.

FIG. 9 is a flowchart of an algorithm for implementing the switching method according to one particular embodiment of the invention.

In a step 900, the relay node 100, by means of a detection sensor 110, detects the arrival of an optical data stream on a given wavelength through a given input port. It is the detection sensor 110 that enables the relay node 100 to know the wavelength of the detected optical data stream and determine the control line brought into play to manage any collision with a preceding optical data stream, in the time domain.

In a step 910, the relay node 100 determines the output port to be used for the optical data stream detected by means of a predetermined policy of transporting, the principle of which has been described further above with reference to FIGS. 1 and 2.

In a step 920, the relay node 100 then determines a variable duration of delay to be applied to the current optical data stream by the determined processing line to prevent any possible collision on the predetermined output port between the current optical data stream and one or more preceding optical data streams.

In a step 930, the relay node 100 configures the variable delay line of the determined processing line so as to apply the duration of variable delay determined at the step 920.

Figure 10:
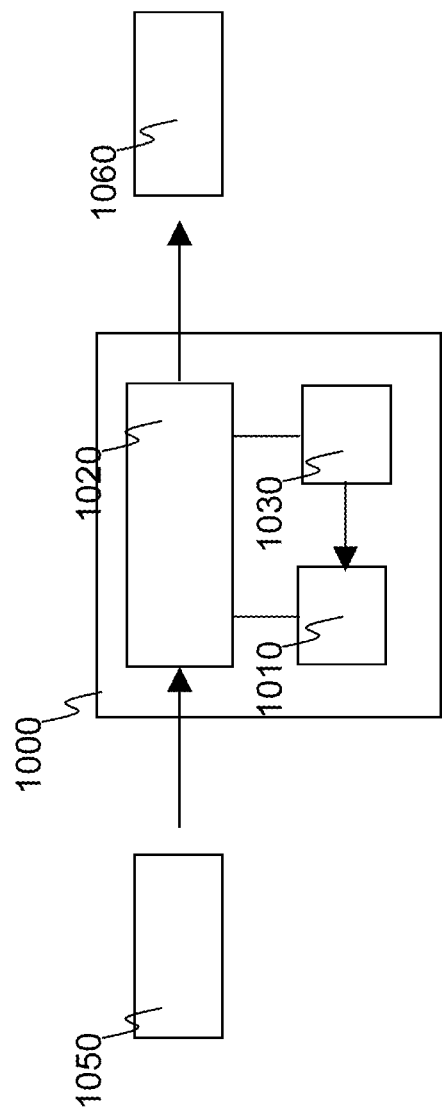
FIG. 10 is a simplified structure of a communications node implementing the switching method according to the invention.

FIG. 10 presents the simplified structure of a relay node 1000 implementing the method of switching according to the invention (for example the particular embodiment described here above with reference to FIG. 9).

This relay node 1000 comprises a RAM 1030, a processing unit 1020, equipped for example with a processor and driven by a computer program stored in a ROM 1010. When the method is initialized, the instructions of the computer program code are for example loaded into the RAM 1030 and then executed by the processor of the processing unit 1010.

The processing unit 1010 inputs a piece of information 1050 informing it of the detection of an optical data stream on an input port i at a wavelength j. The processor of the processing unit 1020 processes the information 1050 and outputs a piece of information 1060 for configuring the variable delay line, according to the instructions of the program.

It must be noted that this FIG. 10 illustrates only one particular way, among several possible ways, of obtaining the different algorithms described in detail here above with reference to FIGS. 7 and 9. Indeed, the technique of an embodiment of the invention can be carried out equally well:

on a reprogrammable computing machine (a PC, a DSP or a microcontroller) executing a program comprising a sequence of instructions; or on a dedicated computing machine (for example a set of logic gates such as an FPGA or an ASIC).

Should an embodiment of the invention be implanted in a reprogrammable computing machine, the corresponding program (i.e. the sequence of instructions) may or may not be stored in a detachable storage medium (such as for example a floppy disk, a CD-ROM or a DVD-ROM), this storage medium being partially or totally readable by a computer or a processor.

Although the present disclosure has been described with reference to one or more examples, workers skilled in the art will recognize that changes may be made in form and detail without departing from the scope of the disclosure and/or the appended claims.

The invention claimed is:

1. A method for switching an optical data stream by a node of an optical network capable of switching optical data received at input ports to output ports, wherein the method comprises:

a step of managing collisions comprising steps including, upon detection of a start of reception of a given stream of optical data on a given wavelength by a given input port, the given stream being intended for processing by a given processing line comprising a variable delay line:

determining a resource of the node as a function of a sensor having detected the given stream on the given wavelength and as a function of a predetermined transporting policy such that, for the given wavelength which is common to the source and destination nodes of the given stream, transporting in the optical network is done according to a routing tree that covers said optical network and of which one root is the destination node, said resource being either an output port or a set of input ports;

consulting a table of occupancy of said resource, said table of occupancy indicating whether at least one preceding stream, if any, uses said resource;

determining a delay to be applied by the given processing line to prevent collision between the given stream and said at least one preceding stream, if any; and configuring the variable delay line of the given processing line so that the variable delay line applies the determined delay.

2. The method according to claim 1, wherein the resource is an output port and the step of determining the delay comprises:

obtaining at least one piece of occupancy information from the table of occupancy indicating whether the determined output port is free or occupied by at least one preceding stream, if any and, if occupied, indicating a limit date of occupancy;

taking a zero duration for the delay if the determined output port is free;

determining a non-zero duration for the delay such that the given stream reaches the output port at a date subsequent to the limit occupancy date if the determined output port is occupied; and updating said at least one piece of occupancy information to indicate a new limit date of occupancy.

3. The method according to claim 1, wherein the resource is a set of input ports and the step of determining the delay comprises:

verifying that the variable delay line of the processing line associated with the sensor having detected the given stream is free and marking it as occupied;

obtaining at least one piece of occupancy information for each variable delay line of processing lines respectively associated with the input ports of the set, said piece of occupancy information indicating whether the variable delay line is free or occupied by at least one preceding stream;

configuring unoccupied variable delay lines with a new duration equal to the sum of a current duration plus a determined duration.

4. The method according to claim 3, further comprising steps which, as a function of a date of arrival of the given stream, comprise:

updating a variable associated with the routing tree;

modifying the table of occupancy of the variable delay line of the processing line associated with the sensor having detected the given stream, in order to indicate that the delay line is free, said modification being activated at the end of a duration, measured starting from the date of arrival of the given stream, and equal to the sum of the value of the variable and of a duration representing the duration of the given stream; and configuring the variable delay line of the processing line associated with the sensor having detected the given stream with the value of the variable.

5. The method according to claim 1, wherein the detection of a start of reception of a given optical data stream on a given wavelength by a given input port is obtained by a solution belonging to the group of solutions consisting of implementation of a detection of an envelope and detection of a start demarcating field attached to the stream.

6. The method according to claim 1, wherein the determining of a non-zero duration for the delay comprises determining the duration of the given stream, and wherein the determining of the duration of the given stream is obtained by the detection of an end of reception of a given optical data stream on a given wavelength by a given input port, said detection being itself obtained by a solution belonging to a group of solutions consisting of implementation of a detection of an envelope and detection of an end demarcating field attached to the stream.

7. The method according to claim 1, wherein the method comprises verifying that the variable delay line of the processing line associated with the sensor having detected the given stream is vacant and, in the event of positive verification, the step of managing collisions is performed, and if not the given optical data stream is rejected.

8. A non-transitory computer-readable medium comprising a computer program product stored thereon, which comprises program code instructions for implementing a method of switching an optical data stream by a node of an optical network capable of switching optical data received at input ports to output ports, when said program is executed on a computer, wherein the instructions comprise:
  instructions configured to manage collisions upon detection of a start of reception of a given stream of optical data on a given wavelength by a given input port, the given stream being intended for processing by a given processing line comprising a variable delay line, wherein managing collisions comprises:
  determining a resource of the node as a function of a sensor having detected the given stream on the given wavelength and as a function of a predetermined transporting policy such that, for the given wavelength which is common to the source and destination nodes of the given stream, transporting in the optical network is done according to a routing tree that covers said optical network and of which one root is the destination node, said resource being either an output port or a set of input ports;
  consulting a table of occupancy of said resource, said table of occupancy indicating whether at least one preceding stream, if any, uses said resource;
  determining a delay to be applied by the given processing line to prevent collision between the given stream and said at least one preceding stream, if any; and
  configuring the variable delay line of the given processing line so that the variable delay line applies the determined delay.

9. A node of an optical network, the node comprising:
  input ports;
  output ports, wherein the node is configured to switch optical data received at the input ports to the output ports; and
  means for managing collisions comprising the following means, activated upon detection of a start of reception of a given stream of optical data on a given wavelength by a given input port, the given stream being intended for processing by a given processing line comprising a variable delay line:
  means for determining a resource of the node as a function of a sensor having detected the given stream on the given wavelength and as a function of a predetermined transporting policy such that, for the given wavelength which is common to the source and destination nodes of the given stream, transporting in the optical network is done according to a routing tree that covers said optical network and of which one root is the destination node, said resource being either an output port or a set of input ports;
  means for consulting a table of occupancy of said resource, said table of occupancy indicating whether at least one preceding stream, if any, uses said resource;
  means for determining a delay to be applied by the given processing line to prevent collision between the given stream and said at least one preceding stream, if any; and
  means for configuring the variable delay line of the given processing line so that the variable delay line applies the determined delay.

10. The node according to claim 9, wherein the node further comprises the following means, activated upon detection of a request for transmission to a destination node of a local data stream for which the local node is also a source node:
  means for determining the output port to be used for the local data stream, as a function of said predetermined transporting policy;
  means for obtaining at least one piece of information on occupancy, indicating whether the determined output port is free or occupied by at least one preceding stream, and should the determined output port be occupied, a limit date of occupancy;
  means for determining a time range in which the determined output port is free to transmit the local data stream as a function of said at least one piece of information on occupancy;
  means for updating said at least one piece of information on occupancy, to indicate a new subsequent limit date of occupancy taking account of a reservation of the output port determined during said time range; and
  means for inserting the local data stream in said determined output port, during said time range.

11. The node according to claim 9, wherein, to detect the start of reception of a given optical data stream on a given wavelength by a given input port, the node comprises at least one of means for detecting an envelope or means for detecting a start demarcating field attached to the stream.

12. A system for switching optical data in an optical network comprising a plurality of nodes having input ports and output ports, each being capable of switching optical data received at the input ports to the output ports, the system comprising, for each node of said plurality:
  means for managing collisions comprising the following means, activated upon detection of a start of reception of a given stream of optical data on a given wavelength by a given input port, the given stream being intended for processing by a given processing line comprising a variable delay line:
  means for determining a resource of said node as a function of a sensor having detected the given stream on the given wavelength and as a function of a predetermined policy of transporting such that, for the given wavelength which is common to source and destination nodes of the given stream belonging to said plurality of nodes, transporting in the optical network is done according to a routing tree that covers said optical network of which has one root is the destination node, said resource being either an output port or a set of input ports;
  means for consulting a table of occupancy of said resource, said table of occupancy indicating whether at least one preceding stream, if any, uses said resource;
  means for determining a delay to be applied by the given processing line to prevent a collision between the given stream and said at least one preceding stream, if any; and
  means for configuring the variable delay line of the given processing line so that the variable delay line applies the determined delay.

* * * * *